United States Patent [19]

Gessner et al.

[11] Patent Number: 5,347,022
[45] Date of Patent: Sep. 13, 1994

[54] PREPARATION OF DI- OR TRIARYLMETHANE DYES BY OXIDATION

[75] Inventors: Thomas Gessner, Heidelberg; Udo Mayer, Frankenthal, both of Fed. Rep. of Germany

[73] Assignee: BASF Aktiengesellschaft, Ludwigshafen, Fed. Rep. of Germany

[21] Appl. No.: 38,865

[22] Filed: Mar. 29, 1993

[30] Foreign Application Priority Data

Apr. 8, 1992 [DE] Fed. Rep. of Germany ....... 4211782

[51] Int. Cl.$^5$ .............................................. C09B 11/10
[52] U.S. Cl. .................... 552/113; 552/114; 552/110; 552/108; 564/330
[58] Field of Search ............... 552/113, 114, 108, 110; 564/330

[56] References Cited

U.S. PATENT DOCUMENTS 4,000,135 12/1976 Kast .
4,321,207 3/1982 Cesark .

FOREIGN PATENT DOCUMENTS 114828 8/1975 Fed. Rep. of Germany .
2-47160 2/1990 Japan .
WO91/01985 2/1991 PCT Int'l Appl. .

OTHER PUBLICATIONS

Chemistry Letters, pp. 1217–1220, Apr. 15, 1991, E. Kimura, et al., "The Proximal Imidazole Effect on Manganese(III)–Cyclam Complex".

Kontakte 1985, vol. 3, pp. 38–48, D. Wohrle, et al., "Phthalocyanine—EIN System Ungewohnlicher Struktur und Eigenschaften".

Chemical Abstracts of Japan, AN–48849, JP-A-5-7-848, May 20, 1981.

Chemical Abstracts of Japan, AN–57396A, JP-A-74 530, Jul. 3, 1978.

*The Analytical Chemistry of Sulfur and its Compounds*, Part I, J. H. Karchmer, Ed., Wiley Interscience, pp. 255–257.

Patent Abstracts of Japan, vol. 14, No. 211, May 2, 1990, JP-A-2-47160, Feb. 16, 1990.

Patent Abstracts of Japan, vol. 5, No. 120, (C-65)(792) Aug. 4, 1981, JP-A-56-57848, May 20, 1981.

Patent Abstracts of Japan, vol. 2, No. 110, Sep. 13, 1978, JP-A-53-74530, Mar. 7, 1978.

Cotton Advanced Inorg Chem. 2nd ed (1966) p. 3770.

*Primary Examiner*—Alan Siegel
*Attorney, Agent, or Firm*—Oblon, Spivak, McClelland, Maier & Neustadt

[57] ABSTRACT

A process for preparing di- or triarylmethane dyes by oxidation of di- or triarylmethanes in the presence of a diluent and of an oxygen transfer catalyst that contains a complexed heavy metal ion or of a catalyst based on molybdenic acid and vanadium compounds comprises using as oxidizing agent peroxomonosulfuric acid or a salt thereof.

6 Claims, No Drawings

PREPARATION OF DI- OR TRIARYLMETHANE DYES BY OXIDATION

The present invention relates to a novel process for preparing di- or triarylmethane dyes by oxidation of di- or triarylmethanes in the presence of a diluent and of an oxygen transfer catalyst that contains a complexed heavy metal ion or of a catalyst based on molybdenic acid and a $VO^{2\oplus}$ compound.

JP-A-74 530/1978 discloses the preparation of triarylmethane dyes by oxidation of triarylmethanes with hydrogen peroxide in the presence of copper(II) salts, e.g. copper sulfate or copper chloride. Furthermore, JP-A-57 848/1981 describes carrying out the oxidation process with hydrogen peroxide, chloranil and a metal compound, e.g. copper(I) bromide or vanadium pentoxide.

Finally, according to JP-A-47 160 (1990) the oxidation of carboxyl-containing triarylmethanes to phthalides with hydrogen peroxide or oxygen as oxidizing agent should be carried out in the presence of an iron compound, e.g. iron chloride, iron sulfate or iron phthalocyanine, and in the additional presence of a manganese compound, e.g. manganese oxide, manganese chloride or manganese sulfate, and of a sequestering agent, e.g. tartaric acid, gluconic acid or ethylenediaminetetraacetic acid.

It has been found that the prior art processes still have defects. For instance, the processes mentioned are not universally usable for preparing di- or triarylmethane dyes.

It is an object of the present invention to provide a novel process for preparing di- or triarylmethane dyes which starts with the corresponding di- or triarylmethanes and is carried out in the presence of an oxygen transfer catalyst that contains a complexed heavy metal or of a catalyst based on molybdenum and vanadium, The novel process shall produce the target products in a simple manner and in high yield and purity.

We have found that this object is achieved by a process for preparing dyes of the formula I

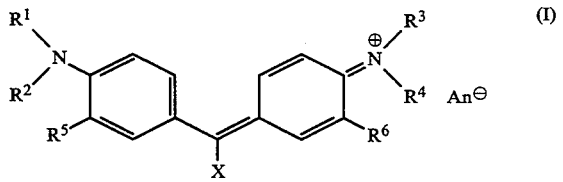

where $R^1$, $R^2$, $R^3$ and $R^4$ are independently of one another $C_1$–$C_8$-alkyl, which may be substituted and may be interrupted by from 1 to 3 oxygen atoms in the ether function, phenyl or $C_1$–$C_4$-alkylphenyl, $R^5$ and $R^6$ are independently of one another hydrogen or methyl, X is hydrogen, substituted or unsubstituted phenyl or substituted or unsubstituted naphthyl, and $An^{\ominus}$ is the equivalent of an anion, by oxidation of a leuco compound of the formula II

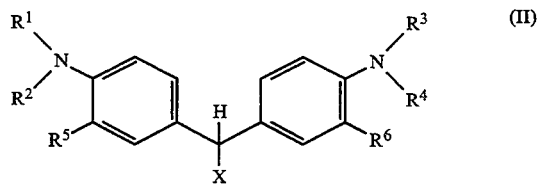

where $R^1$, $R^2$, $R^3$, $R^4$, $R^5$, $R^6$ and X are each as defined above, in the presence of a diluent and of an oxygen transfer catalyst which contains a complexed heavy metal ion, or of a catalyst comprising molybdenic acid and vanadium in the form of $VO^{2\oplus}$ ions or pentavalent compounds, which comprises using as oxidizing agent peroxomonosulfuric acid or a salt thereof.

Any alkyl groups appearing in the abovementioned formulae I and II can be straight-chain or branched.

Any substituted alkyl groups appearing in the abovementioned formulae I and II may have as substituents for example hydroxyl, chlorine, cyano, phenyl or hydroxysulfonylphenyl.

Any substituted phenyl groups appearing in the abovementioned formulae I and II may have as substituents for example methyl, chlorine, amino, $C_1$–$C_4$-mono- or dialkylamino, mono- or diphenylamino, hydroxyl, $C_1$–$C_4$-alkoxy or hydroxysulfonyl, hydroxysulfonyl being preferred.

Any substituted naphthyl groups appearing in the abovementioned formulae I and II may have as substituents for example amino, $C_1$–$C_4$-mono- or dialkylamino, mono- or diphenylamino or hydroxysulfonyl.

Any substituted alkyl, phenyl or naphthyl groups appearing in the abovementioned formula are in general monosubstituted, disubstituted or trisubstituted, preferably monosubstituted or disubstituted.

Suitable radicals $R^1$, $R^2$, $R^3$ and $R^4$ are for example methyl, ethyl, propyl, isopropyl, butyl, isobutyl, secbutyl, pentyl, isopentyl, neopentyl, tert-pentyl, hexyl, heptyl, octyl, 2-ethylhexyl, 2-hydroxyethyl, 2- or 3-hydroxypropyl, 2- or 4-hydroxybutyl, 2-chloroethyl, 2- or 3-chloropropyl, 2- or 4-chlorobutyl, 2-cyanoethyl, 2- or 3-cyanopropyl, 2- or 4-cyanobutyl, benzyl, 1- or 2-phenylethyl, hydroxysulfonylbenzyl, hydroxysulfonylphenylethyl, 2-methoxyethyl, 2-ethoxyethyl, 2- or 3-methoxypropyl, 2- or 3-ethoxypropyl, 2- or 4-methoxybutyl, 2- or 4-ethoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 5-hydroxy-3-oxapentyl, 5-hydroxy-1,4-dimethyl-3-oxapentyl, 8-hydroxy-3,6-dioxaoctyl, 11-hydroxy-3,6,9-trioxaundecyl, phenyl, 1-,2- or 3-methylphenyl or 1-,2- or 3-ethylphenyl.

Suitable X is for example phenyl, 2-, 3- or 4-methylphenyl, 2,4-dimethylphenyl, 2-, 3- or 4-chlorophenyl, 2,4- or 2,6- dichlorophenyl, 2-, 3- or 4-aminophenyl, 2-, 3- or 4-mono- or dimethylaminophenyl, 2-, 3- or 4-mono- or diphenylaminophenyl, 2-, 3- or 4-hydroxyphenyl, 2-, 3- or 4-methoxyphenyl, 2,4-dimethoxyphenyl, 2-, 3- or 4-hydroxysulfonylphenyl, 2,4-dihydroxysulfonylphenyl, 2,4-dihydroxysulfonyl-5-hydroxyphenyl, aminonaphthyl, mono- or dimethylaminonaphthyl, mono- or diphenylaminonaphthyl or hydroxysulfonylnaphthyl.

Suitable anions are for example fluoride, chloride, bromide, iodide, hydrogensulfate, sulfate, tetrafluoroborate, formate, acetate, propionate, mono-, di- or trichloroacetate, lactate, methoxyacetate, citrate, succinate, methylsulfonate, benzenesulfonate and 2- or 4-methylbenzenesulfonate.

When the dyes of the formula I have hydroxysulfonyl radicals and are in the salt form, suitable counter-ions are metal or ammonium ions. Metal ions are in particular the lithium, sodium or potassium ions. Ammonium ions for the purposes of the present invention are either substituted or unsubstituted ammonium cations. Substituted ammonium cations are for example monoalkyl-, dialkyl-, trialkyl-, tetraalkyl- or benzyltrialkylammonium cations or cations derived from nitrogen-containing five- or six-membered saturated heterocycles, such as pyrrolidinium, piperidinium, morpholinium, piperazinium or N-alkylpiperazinium cations or their N-monoalkyl- or N,N-dialkyl-substituted products.

Alkyl is here to be understood as meaning in general straight-chain or branched $C_1$–$C_{20}$-alkyl which may be substituted by hydroxyl groups and/or interrupted by oxygen atoms in ether function.

Sodium and potassium ions are preferred.

Preference is given to a process for preparing dyes of the formula I where $R^5$ and $R^6$ are each hydrogen.

Preference is further given to a process for preparing dyes of the formula I where $R^1$, $R^2$, $R^3$ and $R^4$ are each substituted or unsubstituted $C_1$–$C_4$-alkyl in particular hydroxyl- or hydroxysulfonyl phenyl-substituted $C_1$–$C_4$-alkyl.

Particular preference is given to a process for preparing dyes of the formula I where X is hydrogen or substituted or unsubstituted phenyl, in particular chlorine- or hydroxysulfonyl-substituted phenyl.

Particular preference is further given to a process for preparing dyes of the formula I where $R^1$, $R^2$, $R^3$ and $R^4$ are each $C_1$–$C_4$-alkyl, $C_2$–$C_4$-hydroxyalkyl or hydroxysulfonylbenzyl.

Of particular note is a process for preparing dyes of the formula I in which $R^1$ and $R^3$ are each ethyl, $R^2$ and $R^4$ are each hydroxysulfonylbenzyl, $R^5$ and $R^6$ are each hydrogen, and X is hydroxysulfonyl-substituted phenyl.

Of particular commercial interest is the preparation of C.I. Acid Blue 1 (42045), C.I. Acid Blue 3 (42051) or C.I. Acid Blue 9 (42090) by the process of the invention.

Suitable catalysts which transfer oxygen and contain a complexed heavy metal ion are for example members of the class of the porphyrins, tetraaza[14]annulenes, phthalocyanines or tetraazacyclotetradecanes.

The complexed heavy metal ions are derived for example from iron, manganese, cobalt or chromium. The heavy metal ions are in general 2- or 3-valent.

Compounds of this type are known per se and described for example in DE-A-2,427,606, WO-A-91/01985, Kontakte 1985, 38, or in Chem. Lett. 1991, 1217.

They conform for example to the following formulae:
Porphyrins:

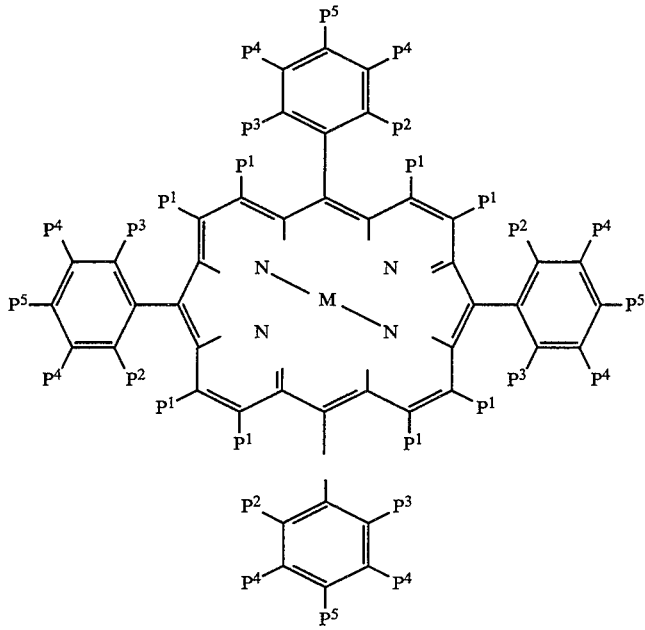

$p^1$ = hydrogen, methyl, ethyl, chlorine or bromine
$p^2$, $p^3$,
4, $p^5$ = hydrogen, methyl, hydroxysulfonyl or $C_1$–$C_4$-alkoxy
M = iron, manganese, cobalt or chromium.
Tetraaza[14]annulenes:

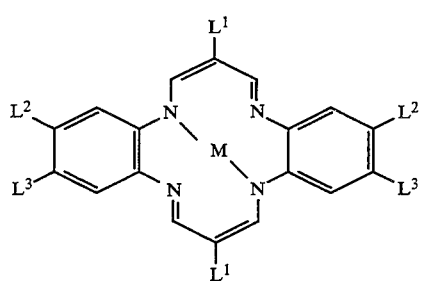

$L^1$ = hydrogen, $C_1$–$C_8$-alkyl, chlorine, $C_1$–$C_4$-alkoxy, substituted or unsubstituted phenyl, substituted or unsubstituted phenylazo, $C_1$–$C_4$-alkoxycarbonyl or unsubstituted or $C_1$–$C_4$-alkyl-, carboxyl-, $C_1$–$C_4$-alkoxycarbonyl- or carbamoyl-substituted pyridylium $L^2$, $L^3$ = hydrogen, methyl or $L^2$ and $L^3$ together = a fused benzo ring M=iron, manganese, cobalt or chromium.
Phthalocyanines:

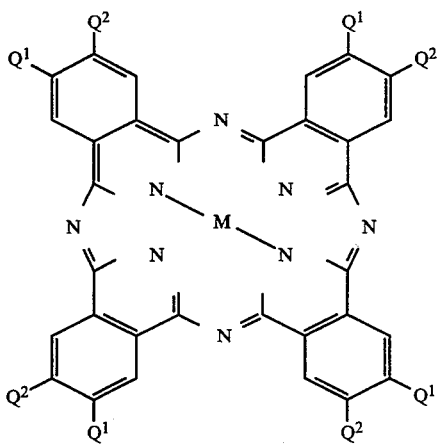

$Q^1$, $Q^2$=$C_1$-$C_4$-alkyl, chlorine, bromine, $C_1$-$C_4$-alkoxy or $Q^1$ and $Q^2$ together=a fused benzo ring
M=iron, manganese, cobalt or chromium.
Tetraazacyclotetradecanes:

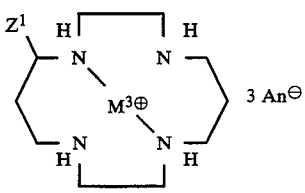

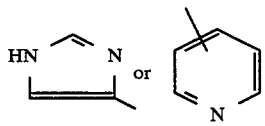

Preference is further given to the use of catalysts containing a complexed iron ion.

Particular preference is given to the use of iron tetraaza[14]annulenes or iron phthalocyanines as catalysts.

Very particular preference is given to the use of iron-5,14-dihydrodibenzo[b,i][5,9,14,18]tetraaza[14]annulene or iron phthalocyanine as catalyst.

A further catalyst that may be used in the process of the invention comprises molybdenic acid ($H_2MoO_4$) and vanadium in the form of $VO^{2\oplus}$ ions or pentavalent compounds. Suitable counter-ions are for example halide ions, such as fluoride, chloride or bromide ions, or sulfate or hydrogensulfate ions.

Per mole of molybdenic acid it is a general rule to use from 0.2 to 20 mol, preferably from 1 to 5 mol, of vanadium catalyst.

Catalysts of this type are known per se and described for example in U.S. Pat. No. 4,321,207.

The catalysts can be used homogeneously or heterogeneously in solution. It is also possible for them to be applied to a carrier material, for example silica gel or ion exchanger resin.

The oxidizing agent used in the process of the invention is peroxomonosulfuric acid or, preferably, a salt thereof, in particular an alkali metal salt thereof, such as lithium peroxomonosulfate, sodium peroxomonosulfate or potassium peroxomonosulfate. The use of sodium peroxomonosulfate or of potassium peroxomonosulfate is preferred. It is also possible to use commercial mixtures of potassium peroxomonosulfate with potassium hydrogen-sulfate and potassium sulfate.

The amount of alkali metal peroxomonosulfate employed per mole of leuco compound of the formula II is in general from 1.0 to 1.5 mol, preferably from 1.1 to 1.3 mol, in particular from 1.15 to 1.25 mol.

The catalyst is in general used in an amount of from 0.01 to 10 mol %, preferably from 0.5 to 7 mol %, each percentage being based on the leuco compound II.

Suitable diluents are for example water, glacial acetic acid, chloroform, toluene, N,N-dimethylformamide, N-methylpyrrolidone, alcohols, such as methanol, ethanol, propanol, isopropanol, butanol, isobutanol, glycols, such as ethylene glycol or propylene glycol, or mixtures thereof.

Preference is given to using water or mixtures of water with glacial acetic acid, alcohols or glycols.

The use of water as diluent is particularly preferable.

Two-phase mixtures, resulting for example from using water and a solvent of little if any miscibility with water, are optionally provided with a phase transfer catalyst. Suitable phase transfer catalysts are the customary products known per se, such as tetraalkylammonium halides or benzyltrialkylammonium halides or hydrogen sulfates.

The novel process is in general carried out under atmospheric pressure and at from 0° to 100° C., preferably at from 20° to 40° C. It can be carried out not only continuously but also batchwise.

The novel process is advantageously carried out by introducing the leuco compound II and the diluent as initial charge, in general in a weight ratio of leuco compound II:diluent of from 1:10 to 2:1, preferably from 3:7 to 3:2. Then the catalyst is added, followed by the peroxomonosulfuric acid or a salt thereof, if desired as an aqueous solution thereof, metered into the mixture with thorough stirring. The oxidation then takes place with stirring at the abovementioned temperature.

Within a period of from 0 to 2 hours from the time of addition of the oxidizing agent the reaction will in general have ended, and the reaction mixture is brought to 20°-80° C. The target product can then be separated off in a conventional manner, for example by salting out with sodium sulfate, and if necessary be redissolved and reprecipitated once more.

The process of the invention is simple to carry out and gives the dyes of the formula I in high yield and purity. Further advantages of the novel process are an oxidizing agent that is free of heavy metal and a short reaction time.

The dyes of the formula I are useful for coloring paper and for use in the sanitary sector.

The invention will now be more particularly described by way of example.

EXAMPLE 1

To 81.4 g (50 mmol) of a 47.3% strength by weight aqueous solution of 4',4''-bis[N-ethyl-N-(3-hydroxysulfonylbenzyl)amino]triphenylmethane-2-sulfonic acid, sodium salt, were added 0.34 g (1 mmol) of iron-5,14-dihydrodibenzo[b,i][5,9,14,18]tetraaza[14]annulene and a solution of 18.4 g (60 mmol) of potassium peroxomonosulfate in 100 ml of water, added dropwise with vigorous stirring at room temperature over 25 minutes. After stirring at room temperature for one hour, the solution was filtered and then heated to 75° C. The dye was salted out with sodium sulfate and separated hot from the aqueous phase. The dye resin was dissolved in water. The solution was adjusted to pH 4 with sodium hydroxide solution. Removal of water and subsequent drying left 42.8 g of salt-containing dye.

EXAMPLE 2

To 96.3 g (50 mmol) of a 40% strength by weight aqueous solution of 4',4''-bis[N-ethyl-N-(3-hydroxysulfonylbenzyl)amino]triphenylmethane-2-sulfonic acid, sodium salt, were added 0.51 g (1 mmol) of iron phthalocyanine, followed by a solution of 18.4 g (60 mmol) of potassium peroxomonosulfate in 100 ml of water added at room temperature dropwise with vigorous stirring. The solution was stirred at room temperature for one hour and then worked up as described in Example 1. 39.6 g of salt-containing dye were obtained.

EXAMPLE 3

To 96.3 g (50 mmol) of a 40% strength by weight aqueous solution of 4',4''-bis[N-ethyl-N-(3-hydroxysulfonylbenzyl)amino]triphenylmethane-2-sulfonic acid, sodium salt, were added at room temperature 2.4 g of vanadium catalyst and 7.4 g of molybdenic acid, which were each prepared as described in Examples 1 and 2 of U.S. Pat. No. 4,321,207, followed by a solution of 18.4 g (60 mmol) of potassium peroxomonosulfate in 100 ml of water, added dropwise with vigorous stirring. The solution was stirred at room temperature for one hour and then worked up as described in Example 1. 38.2 g of salt-containing dye were obtained.

The method of the preceding examples can also be used to oxidize the leuco compounds of the formula

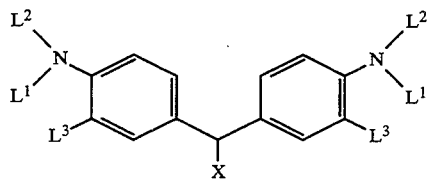

| Ex. No. | $L^1$ | $L^2$ | $L^3$ | X | Hue |
|---|---|---|---|---|---|
| 4 | $C_2H_5$ | $C_2H_5$ | H | | blue |
| 5 | $C_2H_4OH$ | $C_2H_4OH$ | H | 2,6-dichlorophenyl | blue |
| 6 | $C_2H_4OH$ | $C_2H_4OH$ | H | 2-chlorophenyl | blue |
| 7 | $C_2H_4OH$ | $C_2H_4OH$ | H | $C_6H_5$ | greenish blue |
| 8 | $C_2H_5$ | H | $CH_3$ | 2-chlorophenyl | blue |
| 9 | $C_2H_5$ | $C_2H_5$ | H | 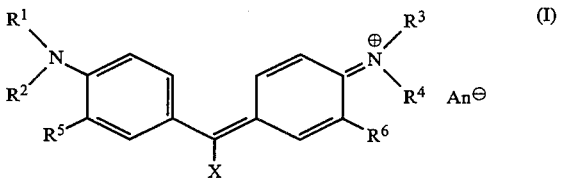 | blue |
| 10 | $C_2H_5$ | $C_2H_5$ | H | 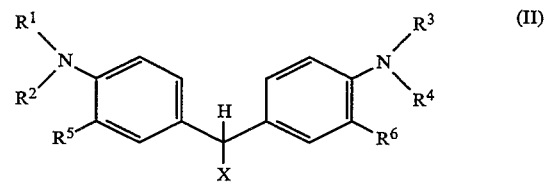 | blue |

We claim:
1. A process for preparing dyes of the formula I

$$\begin{array}{c} R^1 \\ \diagdown \\ R^2 \end{array} N \text{—Ar—C(X)=Ar=} \overset{\oplus}{N} \begin{array}{c} R^3 \\ \diagup \\ R^4 \end{array} \quad An^{\ominus} \quad (I)$$

where
R$^1$, R$^2$, R$^3$ and R$^4$ are independently of one another C$_1$–C$_8$-alkyl which may be substituted and may be interrupted by from 1 to 3 oxygen atoms in the ether function, phenyl or C$_1$–C$_4$-alkylphenyl, and
R$^5$ and R$^6$ are independently of one another hydrogen or methyl,
X is hydrogen, substituted or unsubstituted phenyl or substituted or unsubstituted naphthyl, and
An$^\ominus$ is an anion, by oxidation of a leuco compound of the formula II $$\begin{array}{c} R^1 \\ \diagdown \\ R^2 \end{array} N \text{—Ar—CH(X)—Ar—} N \begin{array}{c} R^3 \\ \diagup \\ R^4 \end{array} \quad (II)$$

where R$^1$, R$^2$, R$^3$, R$^4$, R$^5$, R$^6$ and X are each as defined above, in the presence of a diluent, peroxomonosulfuric acid or a salt thereof as oxidizing agent, and a catalyst consisting essentially of an oxygen transfer catalyst which contains a complexed heavy metal ion; or molybdenic acid in admixture with vanadium in the form of VO$^{2\oplus}$ ions or pentavalent vanadium compounds.

2. A process as claimed in claim 1, wherein R$^5$ and R$^6$ are each hydrogen.

3. A process as claimed in claim 1, wherein R$^1$, R$^2$, R$^3$ and R$^4$ are each substituted or unsubstituted C$_1$–C$_4$-alkyl.

4. A process as claimed in claim 1, wherein X is hydrogen or substituted or unsubstituted phenyl.

5. A process as claimed in claim 1, wherein the oxygen transfer catalyst is a member of the class of the porphyrins, tetraaz[14]annulenes, phthalocyanines or tetraazacyclotetradecanes.

6. A process as claimed in claim 1, wherein the heavy metal ion complexed within the oxygen transfer catalyst is derived from iron, manganese, cobalt or chromium.

* * * * *